(12) United States Patent
Rivera Claro (10) Patent No.: US 11,982,590 B2
(45) Date of Patent: May 14, 2024

(54) GAS MONITORING SYSTEM

(71) Applicant: Siemens Energy Global GmbH & Co. KG, Bayern (DE)

(72) Inventor: Oscar Javier Rivera Claro, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 140 days.

(21) Appl. No.: 17/638,384

(22) PCT Filed: Aug. 24, 2020

(86) PCT No.: PCT/EP2020/073636
§ 371 (c)(1),
(2) Date: Feb. 25, 2022

(87) PCT Pub. No.: WO2021/043613
PCT Pub. Date: Mar. 11, 2021

(65) Prior Publication Data
US 2022/0299398 A1    Sep. 22, 2022

(30) Foreign Application Priority Data

Sep. 4, 2019 (EP) .................................... 19195399

(51) Int. Cl.
*G01M 3/26* (2006.01)
*H01H 33/59* (2006.01)

(52) U.S. Cl.
CPC .............. *G01M 3/26* (2013.01); *H01H 33/59* (2013.01)

(58) Field of Classification Search
CPC ....................................................... G01M 3/26
(Continued)

(56) References Cited

U.S. PATENT DOCUMENTS 4,057,699 A * 11/1977 Reis ........................ H01H 35/28
137/557
4,864,286 A * 9/1989 Ohshita ................ H01H 1/0015
324/424

(Continued)

FOREIGN PATENT DOCUMENTS

| CN | 104913825 A | 9/2015 |
| CN | 105182128 A | 12/2015 |

(Continued)

OTHER PUBLICATIONS

PCT International Search Report and Written Opinion of International Searching Authority dated Jan. 12, 2020 corresponding to PCT International Application No. PCT/EP2020/073636 filed Aug. 24, 2020.

*Primary Examiner* — Joseph Chang
(74) *Attorney, Agent, or Firm* — Wolter Van Dyke Davis, PLLC (57) ABSTRACT

An optimized method of monitoring a circuit breaker containing a gas with at least one gas characteristic providing a numerical value includes the steps of a) collecting a dataset referring to the at least one gas characteristic inside the circuit breaker, wherein the dataset contains the numerical value of the at least one gas characteristic during a specific condition or specific time of the day, b) calculation of a standard deviation of the at least one gas characteristic of the datasets of at least 3 days of the last 10 days, c) comparing the standard deviation of the gas pressure with a predefined threshold value, and d) triggering a first action in case the standard deviation exceeds the threshold value.

15 Claims, 3 Drawing Sheets

(58) Field of Classification Search
USPC .......................................................... 307/116
See application file for complete search history.

(56) References Cited

U.S. PATENT DOCUMENTS

| | | | | |
|---|---|---|---|---|
| 5,502,435 A | * | 3/1996 | Ralston | ................ H01H 33/563 |
| | | | | 702/140 |
| 2014/0055274 A1 | | 2/2014 | Hatch et al. | |

FOREIGN PATENT DOCUMENTS

| | | | |
|---|---|---|---|
| CN | 108806218 A | 11/2018 | |
| EP | 3425385 A1 | 1/2019 | |
| JP | 2001186613 A | 7/2001 | |
| JP | 2007263584 A | 10/2007 | |

* cited by examiner

GAS MONITORING SYSTEM

CROSS REFERENCE TO RELATED APPLICATIONS

This application is the US National Stage of International Application No. PCT/EP2020/073636 filed 24 Aug. 2020, and claims the benefit thereof. The International Application claims the benefit of European Application No. EP19195399 filed 4 Sep. 2019. All of the applications are incorporated by reference herein in their entirety.

FIELD OF INVENTION

The present invention refers to an optimized method of monitoring a circuit breaker. Furthermore, the present invention refers to a circuit breaker being adapted to perform such method. Additionally, the present invention refers to a monitoring system. Furthermore, the present invention refers to the use of such circuit breaker or monitoring system.

BACKGROUND OF INVENTION

Circuit breakers are essential components in modern energy generation and distribution systems. Herein, providing the required security of the circuit breakers is especially important and has to be ensured even under extreme conditions.

A well established method to ensure the security of the circuit breakers includes the use of gases like $SF_6$ in such circuit breaker. Herein, such gas like $SF_6$ allows to cool the circuit breaker as well as to quench the arc. The use of $SF_6$, for example, is a reliable and secure method to solve corresponding problems. However, based on the high greenhouse effect the loss of $SF_6$ resulting from, for example, leakages are to be prevented.

To ensure that no detrimental environmental effect is resulting it is necessary to secure a safe handling and storage of the $SF_6$ gas. While the circuit breaker including its valves can be designed accordingly it is still a challenge to prevent such loss $SF_6$ on the long term. While the system might be secure under the planned conditions minor failures during refill actions or contaminations in real life long term usage rendering valves slightly leaky may result in significant losses. Thus, it is still a task to provide a long term solution of enable a safe monitoring. Only providing a secure monitoring method allows to detect a leakage in time and to counteract. Yet it was noted that existing systems, for example, still provide a ratio of accuracy and prevention of false blind results being to be optimized.

SUMMARY OF INVENTION

These problems are solved by the products and methods as disclosed hereafter and in the claims. Further beneficial embodiments are disclosed in the dependent claims and the further description. These benefits can be used to adapt the corresponding solution to specific needs or to solve further problems.

According to one aspect the present invention refers to a method of monitoring a circuit breaker containing a gas with at least one gas characteristic providing a numerical value containing the steps of a) collecting a dataset referring to the at least one gas characteristic inside the circuit breaker, wherein the dataset contains the numerical value of the at least one gas characteristic during a specific condition or specific time of the day, preferably a specific time, b) calculation of a standard deviation of the at least one gas characteristic of the datasets of at least 3 days of the last 10 days, c) comparing the standard deviation of the gas pressure with a predefined threshold value, d) triggering a first action in case the standard deviation exceeds the threshold value. Surprisingly, it was noted that utilizing such simple method allows to securely detect a beginning loss of gas very early before major problems arise. Simultaneously, the rate of false positive gas loss detections is significantly decreased.

In case multiple gas characteristics providing a numerical value are determined according to the inventive method the action is triggered in case at least one numerical value fulfills the requirement. However, for typical embodiments it is preferred that the numerical values of at least 50%, more preferred at least 75%, of the gas characteristics fulfill the requirement to trigger the action, wherein the required number of the gas characteristics is rounded to an integer. For example, it can be preferred that at least 50% of 3 monitored gas characteristics fulfill the specified requirement meaning 2 of the 3 gas characteristics. To provide a high security against false positive results it can even be preferred that the numerical values of all gas characteristics monitored with the inventive method fulfill this requirement to trigger the action. The aforementioned also applies to the embodiments described hereafter, especially those referring to the second and third action unless explicitly specified otherwise.

According to one aspect the present invention refers to a circuit breaker containing a monitoring device being adapted to realize an inventive method.

According to one aspect the present invention refers to a monitoring system for a circuit breaker, wherein the monitoring system is adapted to perform an inventive method.

According to one aspect the present invention refers to a use of an inventive circuit breaker or an inventive monitoring system to monitor the gas content of a circuit breaker.

According to one aspect the present invention refers to a computer program product with program commands to perform the inventive method.

According to one aspect the present invention refers to a device for providing an inventive computer program product, wherein the device stores the computer program product and/or provides the computer program product for further use.

To simplify understanding of the present invention it is referred to the detailed description hereafter and the figures attached as well as their description. Herein, the figures are to be understood being not limiting the scope of the present invention, but disclosing preferred embodiments explaining the invention further.

DETAILED DESCRIPTION OF INVENTION

Preferably, the embodiments hereafter contain, unless specified otherwise, at least one processor and/or data storage unit to implement the inventive method.

According to one aspect the present invention refers to a method as specified above.

It was noted that the inventive method can be beneficially utilized to secure an immediate action to, for example, prevent a significant loss of $SF_6$. According to further embodiments it is preferred that the first action includes at least one action selected from the group consisting of a notification of an operator, sending a first action dataset to a database, triggering a security mechanism and triggering a further measurement of the at least one characteristic. Such database can be a distributed database providing a security against manipulation. This also applies to the embodiments as disclosed hereafter. For example, a blockchain system can be utilized to protect against manipulation of the entries of the database. For example, the database may further automatically inform service personal to immediately plan some maintenance schedule to review and/or repair the circuit breaker. Herein, it has to be understood that sending such dataset to a database does not necessarily only include that said dataset is added to the database or replaces an existing dataset. It can, for example, also trigger an amendment of the data contained in the database like increasing the number of days of gas loss, increasing the amount of gas lost and/or resetting a value of gas contained in the circuit breaker to reflect some gas refill or the like.

The term "distributed database" as used herein refers to a decentralized database like a blockchain, a distributed ledger, a distributed data storage system, a distributed ledger technology based system, a manipulation proof database, a cloud, a cloud service, a blockchain in a cloud or a peer-to-peer database. Herein, such distributed database can be a public database like a public blockchain or a non public database like a private blockchain. Typically, it is preferred that such blockchain is non public and can only be accessed by authorized persons. Herein, such access right might also be granted for external persons to allow a review of specific data like the gas loss statistics or overall gas loss to determine whether corresponding regulations are fulfilled or not.

The term "data block" as used herein refers to a block of a distributed database like a blockchain or a peer-to-peer database. It may contain data regarding the size of the data block, a block header, a counter of monitored data, data regarding the specific at least one gas characteristic, sensor data and/or monitored data. Said block header can, for example, contain a version number, a checksum, or a time stamp.

Such method as described above can be beneficially utilized to provide an action triggering, for example, a notification of the operator. Surprisingly, it was noted that the corresponding long term information allows to start a replacement process in time allowing to include the replacement process in normal maintenance processes reducing the overall costs while simultaneously raising the security and reliability. This also applies to the second action and third action as described hereafter.

For typical embodiments it was noted that the present method is especially useful to trigger a first action sending a first action dataset to a database. Such first action dataset send to the database can be a dataset recording a determined gas loss in the database and/or a dataset noting inside the database a gas refill. Automatically identifying such gas refill is surprisingly beneficial. Although, the operator is typically enabled to enter such data manually it has been noted that it rarely happens. Utilizing the inventive method as described herein allows to securely detect such gas refill and automatically enter such data. This allows to greatly increase the reliability and monitoring of such circuit breaker. Also, such information can be utilized to trigger a series of collecting datasets to, for example, automatically provide a reliable new value of the current gas content of the circuit breaker. For example, five measurements with at least half an hour distance can be taken to detect the currently contained amount of gas after a refill. Allowing to greatly increase the reliability and safety of the gas monitoring. This especially also applies to the second action as described hereafter.

For further typical embodiments it was noted that the present method is especially useful trigger a first action triggering a further measurement of the at least one characteristic. This allows to automatically provide an improved detection of abnormal data like some deviation resulting from an activity of the circuit breaker to trigger a further measurement of the at least one characteristic. This enables to ensure reliable datasets to be entered into the database to provide a consistent monitoring of the circuit breaker. Also, it allows to predict a gas loss in the early stages removing the risk that some circuit breaker activity might hide a starting gas loss. This also applies to the second action as described hereafter.

Furthermore, it was noted that it is typically beneficial to include a review process to further reduce the number of incorrectly triggered first actions. Based on certain interactions automatically influencing the gas characteristics it is possible to provide corrective data to, for example, identify an allowed deviation from the expected behavior and prevent such false positive detection. According to further embodiments it is preferred that the first action is stopped in case an interaction with the gas has taken place within the period of collecting the datasets. Such interaction includes, for example, a refill of the gas content or replacement of the gas content of the circuit breaker or a complete exchange of the circuit breaker. For example, a corresponding action can be entered in the database, wherein the method receives the corresponding information and avoids an unnecessary notification of the operator. Also such information can be utilized to trigger a series of collecting datasets to, for example, automatically provide a reliable new value of the current gas content of the circuit breaker. This allows to reduce the work to the operator to enter a gas refill, while the reliable measurement of the change of the gas content is automatically performed not requiring additional interaction.

Additionally, it was noted that the inventive method can beneficially include a unique identifier of the circuit breaker to correlate the datasets to a specific circuit breaker. Surprisingly, it was noted that during long term usage short notice replacements of the circuit breakers can take place resulting in deviations from the normal behavior. Also, benefits are obtained for handling a corresponding circuit breaker pool, wherein circuit breakers requiring a more intense maintenance or even replacement can be easily identified. According to further embodiments it is preferred that the dataset contains a unique identifier of the circuit breaker.

It was further noted that such collected datasets are beneficially stored in a database like a distributed database. Some central storage possibility allows to easily monitor and compare the available data. Using typically available communication methods allows to also include review processes by experts to more closely evaluate the correspondingly received data while corresponding actions performed by local field personal and operators are swiftly forwarded and executed. According to further embodiments it is preferred that the collected datasets are stored in a database, more preferred a distributed database.

It was further noted that acquiring the datasets in correlation to a specific time or time interval provides very beneficial results for typical embodiments. While corresponding effects like influences from the surrounding temperature should be expected to be less emphasized based on such trivial aspect it was surprisingly noted that the influence was big enough to give a major benefit for typical applications. According to further embodiments it is preferred that the datasets refer to the at least one gas characteristic inside the circuit breaker during a specific time or interval of the day. Typically, it is preferred that the datasets are collected during nighttime. Herein, it was noted that it further smoothened transition over longer time periods is observed and more reliable data is acquired. According to further embodiments it is preferred that the datasets are collected within the time period from 11 pm to 6 am, more preferred from 1 am to 5 am, even more preferred from 2 am to 5 am. Surprisingly, it was further noted that no significant deviations have been observed for different times of the year. Apparently, the inventive scheme is utilizing the correct time frame to remain highly sensitive while simultaneously ignoring slow overall changes of the temperature resulting from the seasons.

While the typical gas characteristics available to the person skilled in the art may be utilized for the inventive method it was noted that certain gas characteristics are especially useful. Surprisingly, they are not only easy to measure, but also provide an especially high reliability. According to further embodiments it is preferred that the at least one gas characteristic contains the gas density and/or the gas pressure.

While the inventive method can be utilized with different gases available it was noted that the inventive benefits are especially high for $SF_6$ taking into account typical application cases. According to further embodiments it is preferred that the gas is $SF_6$. Surprisingly, the inventive method provides an especially high sensitivity and low amount of false positive detection in this case. Taking into account that the loss of $SF_6$ should especially be restricted based on environment reasons applying the inventive method in this context renders retrofits or replacement of existing systems utilizing this gas especially interesting.

Additionally, it was noted that despite differences to be expected a generic threshold value surprisingly can be utilized for typical applications, especially utilizing $SF_6$. This allows to easily apply the inventive methods to different cases without requiring adaptions still providing an improved reliability. According to further embodiments it is preferred that the predefined threshold value is at most 1%, more preferred at most 0.5%, even more preferred at most 0.1%.

Furthermore, it was noted that a further improvement of the sensitivity can be achieved utilizing an optimized number of days utilized to calculate the standard deviation. According to further embodiments it is preferred that the standard deviation of the at least one gas characteristic of the datasets of at least 4 days of the last 8 days, more preferred the least 5 days of the last 7 days, is calculated. Typically, it is even preferred that the standard deviation is calculated based on the datasets of each of the last 5 days.

Unless specified otherwise terms like "calculate", "process", "determine", "generate", "configure", "reconstruct" and comparable terms refer to actions and/or processes and/or steps modifying data and/or creating data and/or converting data, wherein the data are presented as physical variable or are available as such.

However, it can also be beneficial to increase the number of days included in the calculation of the standard deviation. For example, such embodiments can be especially usefully utilized in application cases providing a more consistent temperature profile like locations at the sea. Taking into account the specific location and condition of the application allows to even further increase the sensitivity and reliability of the method. According to further embodiments it is preferred that the standard deviation of the at least one gas characteristic of the datasets of at least 5 days, more preferred at least 7 days, even more preferred at least 9 days, of the last 10 days is calculated.

Furthermore, it was noted that even in case no loss of gas is noted using the steps of the inventive method as specified above a further method step can be beneficially performed to identify abnormal behavior. According to further embodiments it is preferred that the method includes e) in case the standard deviation is lower than the threshold value the datasets collected during a predefined prior time period are utilized to calculate a linear fitting line, f) wherein the dataset collected in step a) is compared to an upper limit of the linear fitting line, wherein the upper limit of the linear fitting line is the highest value of the linear fitting line within the predefined prior time period, wherein a second action is triggered in case the dataset collected in step a) is less than 100%, more preferred less than 99%, even more preferred less than 98.2%, of the upper limit of the linear fitting line. For example, such predefined prior time period can be at least 30 days, like 30 days, at least 60 days, like 60 days, or at least 90 days, like 90 days. To provide a very reliable linear fitting line it is preferred for typical embodiments that the linear fitting line is calculated for a period of at least 60 days, more preferred at least 90 days. The linear fitting line is calculated as known to the person skilled in the art. For example, the mean error square is minimized to find the most suitable linear fitting line possible.

According to typical embodiments it is preferred that the second action contains sending a notification of an operator and/or sending a second action dataset to a database and/or triggering a security mechanism, more preferred sending a notification of an operator and/or sending a second action dataset to a database. This allows to note, record and/or react to even minor deviation at an early stage for even the first detected abnormality.

Additionally or alternatively it is possible to obtain long term evaluation data utilizing such datasets. Herein, an evaluation is preferably triggered in case the standard deviation is lower than the predefined threshold. The evaluation includes calculating a linear fitting line and evaluating said linear fitting line to allow an overall assessment of the gas loss behavior of the circuit breaker. According to further embodiments it is preferred that the method includes g) in case the standard deviation is lower than the threshold value the datasets collected during a predefined prior time period are utilized to calculate a linear fitting line providing a gradient, h) wherein the gradient is compared to a gradient limit, and wherein in case the gradient is lower than the gradient limit a third action is triggered. The gradient limit can, for example, be a predefined gradient limit, an adaptive gradient limit or a combination of both. Herein, such gradient limit can be predefined and be selected based on the circuit breaker to be monitored. While the person skilled in the art may select a corresponding value based on his experience and corresponding test it was surprisingly noted that said gradient values can also be selected based on corresponding standards as described hereafter. This greatly simplifies retrofitting or setting up a new circuit breaker or taking over existing circuit breakers in case the corresponding data is limited and time for tests is limited. For example, for embodiments of high quality circuit breakers fulfilling new standards it is typically preferred that the gradient limit is selected from the range from −0.01 to −0.0005, more preferred from −0.01 to −0.001. For example, for embodiments monitoring especially short time periods like 30 days it is typically beneficially that the gradient limit is selected from the range from −0.02 to −0.001, more preferred from −0.015 to −0.0015. In case, for example, an older circuit breaker providing a less secure sealing is monitored over a longer time the gradient limit is preferably selected from the range from −0.025 to −0.0015, more preferred from the range from −0.021 to −0.003. In case such older circuit breaker is monitored for a shorter period like 30 days it is typically preferred that the gradient limit is selected from the range from −0.04 to −0.005, more preferred from −0.04 to −0.001. Also, an adaptive gradient limit based on the collected data can be utilized. Herein, the gradient for the first predefined prior time period defined is calculated and the gradient limit is set correlating to this. For example, the gradient limit can be calculated as follows:

$$\text{gradient limit} = \text{calculated gradient} - (X \times \text{gradient})^2)$$

wherein X is an adaption factor being, for example, selected from the range from 0 to 10, more preferred from the range selected from 0 to 7, more preferred selected from the range from 0 to 5. Also, this system can be combined utilizing such predefined gradient limit first and changing to such adaptive gradient limit after acquiring the data for the first predefined prior time period. For example, the predefined prior time period can be at least 30 days like 30 days, at least 60 days like 60 days or at least 90 days like 90 days. To provide a very reliable linear fitting line it is preferred for typical embodiments that the linear fitting line is calculated for a period of at least 60 days, more preferred at least 90 days. The linear fitting line is calculated as known to the person skilled in the art. For example, the mean error square is minimized to find the most suitable linear fitting line possible.

The third action typically preferably contains sending a notification of an operator, sending a third action dataset to a database and/or triggering a security mechanism, more preferred sending a notification of an operator and/or sending a third action dataset to a database. This allows to note, record and/or react to long term changes like in case the sealing of the circuit breaker beginning to worsen or the gas filling unit becoming less secure. This especially allows to easily monitor a complete fleet of circuit breakers and to statistically identify circuit breakers to be serviced or even replaced to prevent a loss of the gas contained therein.

Surprisingly, it was noted that including an automatic forwarding of the dataset significantly increased the overall reliability of the process. According to further embodiments it is preferred that the circuit breaker is adapted to forward the collected dataset automatically. This allows to reduce the amount of mistakes being especially problematic for handling a gas like $SF_6$.

According to another aspect the present invention refers to a circuit breaker as specified above.

Herein, it was noted that it is typically beneficial to include an automatic mechanism collecting the required datasets. For example, implementing a corresponding hardware or software stored on an integrated processing unit allows to prevent a data loss and to optimize the complete method. According to further embodiments it is preferred circuit breaker is adapted to automatically collect the datasets.

While it is preferable to replace existing circuit breakers providing a retrofit for existing systems is also a highly interesting possibility. It was noted that, for example, a corresponding monitoring element being adapted to collect the dataset can be easily attached to the gas filling device like a valve of such circuit breaker being adapted to refill the circuit breaker. Preferably, such monitoring element is adapted to send the collected dataset to a processing unit or data storage or contains a processing unit or data storage. This allows to directly perform the corresponding evaluation steps of the inventive method. Such retrofit especially allows to provide the inventive monitoring capability for an existing fleet of circuit breakers.

The term "processing unit" as used herein refers to data processing units as used for processing data. Herein, for example, calculations, checksums and cryptographic checksums are generated, measured and predefined values are compared, a reaction to a specific situation a determined, an output is generated, a part of a data set is reconstructed, a checksum, preferably cryptographic checksum, is validated, new blocks for a blockchain are generated, new blocks are integrated in the blockchain, and so on. Such processing unit can, for example, be found in computers, clients, smart phones, and servers. For example, such processing unit can also be found in knots of the distributed database like a blockchain.

According to a further aspect the present invention refers to a monitoring system as specified above.

According to further embodiments it is preferred that the monitoring system contains an inventive circuit breaker.

It was noted that it is beneficial to provide the inventive monitoring system with a database allowing to store the collected datasets. According to further embodiments it is preferred that the monitoring system contains a database, preferably a distributed database, wherein the database is adapted to store the datasets.

Furthermore, it was noted that it is beneficial to already include a corresponding processing unit in the monitoring system to calculate the required standard deviation and/or perform the further evaluations. According to further embodiments it is preferred that the monitoring system contains a processing unit being adapted to calculate the standard deviation.

Simultaneously, it was further noted that it is also beneficial to include a corresponding processing unit in the monitoring system to calculate the linear fitting line to provide a more reliable system not relying on external resources. This allows to reduce the data transfer and also prevents that the data can easily be tampered with.

Also, it was surprisingly noted that further applications can be provided by improving the reliability and security of the data forwarded. For example, it was surprisingly noted that the inventive methods allow to be specifically adapted for utilization in maintenance applications by providing secured data that allows a reliable assessment of the current situation. Additionally, this allows to store reliable data the that might be utilized in case of later failures to provide evidence of the state of the circuit breaker if required. According to further embodiments it is preferred that the monitoring system contains a hardware being adapted to provide a secure data connection between the circuit breaker and the database. For example, such system can be realized using an end-to-end encryption between the circuit breaker and the database.

According to another aspect the present invention refers to a use as described above.

According to one aspect the present invention refers to a computer program as specified above.

According to one aspect the present invention refers to a device for providing an inventive computer program product as specified above.

The present invention was only described in further detail for explanatory purposes. However, the invention is not to be understood being limited to these embodiments as they represent embodiments providing benefits to solve specific problems or fulfilling specific needs. The scope of the protection should be understood to be only limited by the claims attached.

Figure 1:
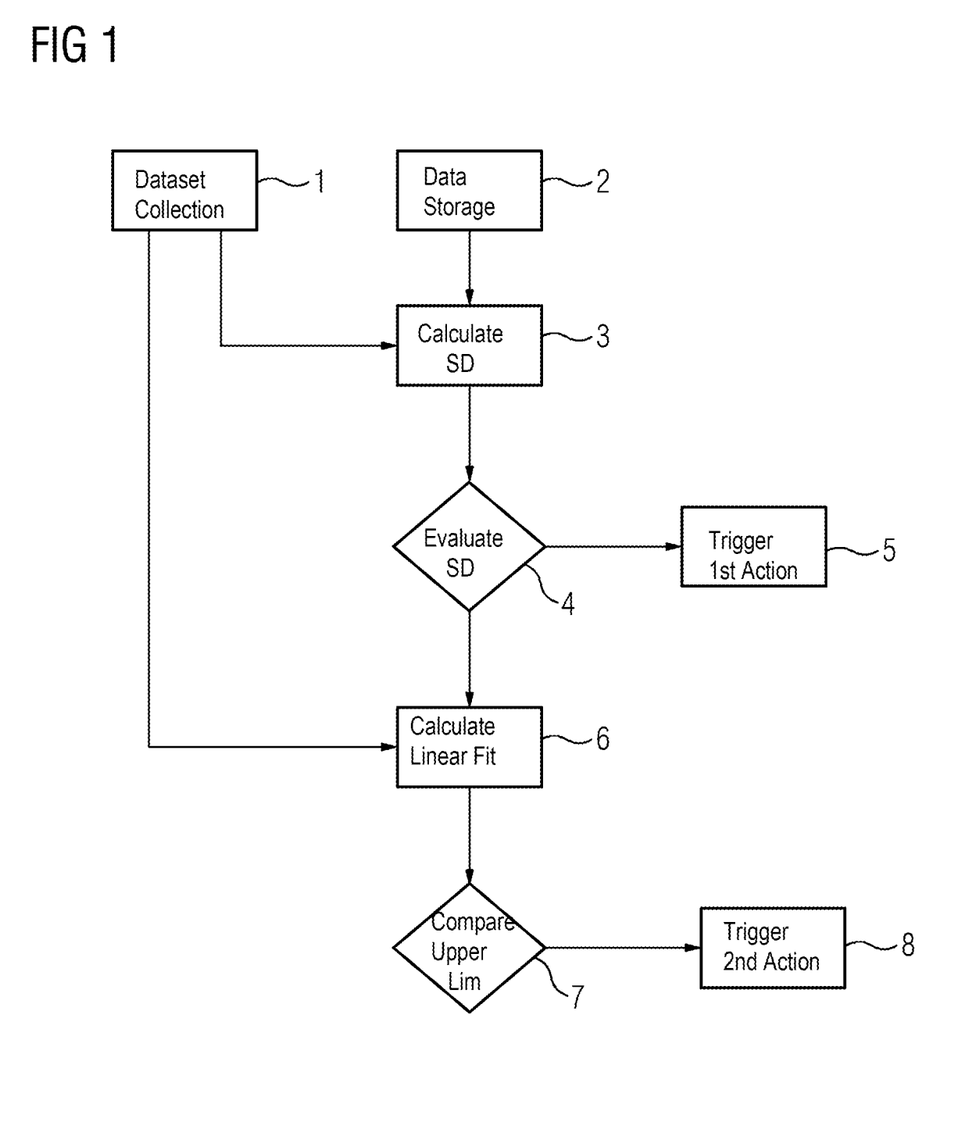
FIG. 1 shows a scheme of an inventive method.

FIG. 1 shows a scheme of an inventive method. In the following the features of an embodiment utilizing such scheme are included for illustrative purposes. However, other embodiments as specified above may be utilized for such scheme. The method is performed utilizing an inventive circuit breaker being part of an inventive monitoring system. The calculations are performed using a device providing a processor and a data storage executing a computer program product to trigger or execute the specified action.

Herein, the dataset containing the numerical value of the gas density of $SF_6$ in a circuit breaker is determined and stored on a data storage during step 2. The determination is performed each day at a specific time at 4 am. Utilizing the collected dataset and datasets stored in the dataset collection 1 a standard deviation is calculated in step 3. Herein, the standard deviation is calculated based on at least three datasets collected during the period of the last ten days, wherein the present day is deemed to be one of these ten days. All datasets collected during this time period are utilized to calculate the standard deviation.

The standard deviation is evaluated in step 4 whether it fulfills the requirement of the predefined threshold being 0.5%. In case it exceeds the threshold step 5 takes place including triggering a first action. The first action includes a notification to the operator informing him/her about this deviation and sending a first action dataset to a database. Herein, the first action dataset is either stored as it is or according to the first action dataset a corresponding database dataset is changed. For example, the number of days providing a specified gas loss is increased by 1. Furthermore, the first action includes a determination step, wherein the dataset is evaluated with regard to the overall security taking into account the determined gas loss. In case certain limits specified by the operator are exceeded a replacement circuit breaker takes over and the monitored circuit breaker is taken off the grid. Simultaneously, a corresponding notification is send to the operator and a maintenance or replacement is scheduled. Before, during or after the first action the dataset is stored in the dataset collection 1.

In case the standard deviation does not exceed the predefined threshold the linear fitting line for the predefined prior time period being the last 60 days is calculated in step 6. Herein, the datasets available for the last 60 days, wherein the present day is deemed to be one of these days, are retrieved from the dataset collection 1 and including the dataset collected in step 2 are utilized to provide the linear fitting line and its upper limit. The upper limit specifies the highest value of the linear fitting line within the predefined prior time period. As it is a linear line the upper limit can be either located at the first or last day of the linear fitting line so that it represents the value for either day 1 or day 60. This also applies in case day 60 is the present day and day 1 has not been measured. In this case, the theoretical value resulting from the linear fitting line is providing the upper limit. The numerical value of the gas density collected in step 2 is compared to the upper limit in step 7 and in case it is lower than 99% of the upper limit step 8 is performed including triggering a second action. The second action includes a notification to the operator to inform him/her about the deviation and draw his attention to this observation. Furthermore, a second dataset is send to a database to update a gas loss protocol to eventually adapt the prediction of the future gas loss and required new $SF_6$ gas for refill actions.

Figure 2:
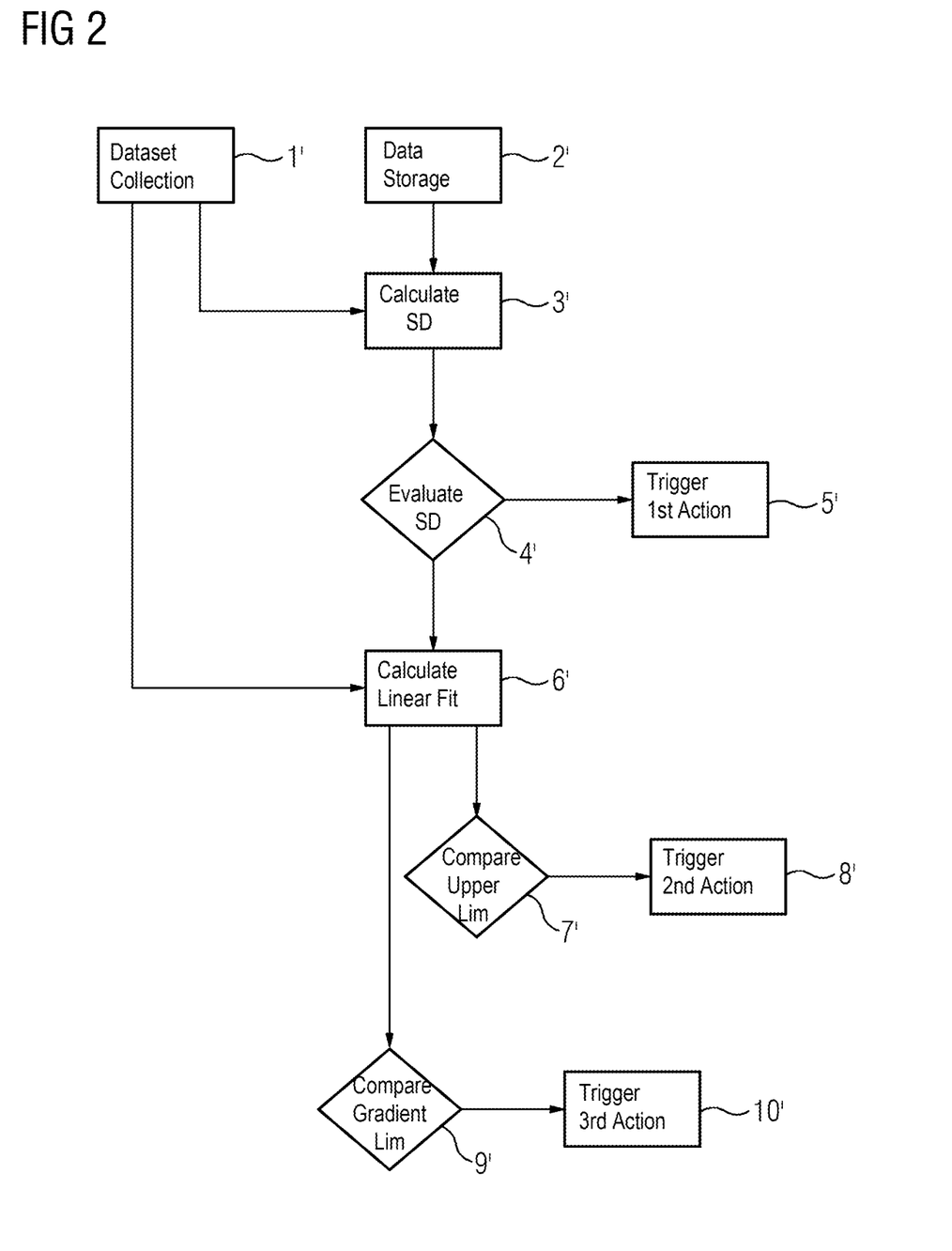
FIG. 2 shows a scheme of a different embodiment of an inventive method.

FIG. 2 shows a scheme of another embodiment of the inventive method. In the following the features of an embodiment utilizing such scheme are included for illustrative purposes. However, other embodiments as specified in the description may be utilized for such scheme. The method is performed utilizing an inventive circuit breaker being part of an inventive monitoring system. The calculations are performed using a device providing a processor and a data storage executing a computer program product to trigger or execute the specified action.

Herein, the dataset containing the numerical value of the gas pressure of $SF_6$ in a circuit breaker is determined and stored on a data storage during step 2'. The determination is performed each day during a specific time period being from 1 am to 5 am. Utilizing the collected dataset and datasets stored in the dataset collection 1' a standard deviation is calculated in step 3'. Herein, the standard deviation is calculated based on at least four datasets collected during the period of the last eight days, wherein the present days is deemed to be one of these eight days. All datasets collected during this time period are utilized to calculate the standard deviation.

The standard deviation is evaluated in step 4' whether it fulfills the requirement of the predefined threshold being 1%. In case it exceeds the threshold step 5' a review step takes place, wherein a database is reviewed whether some interaction with the gas content of the circuit breaker has been noted down. For example, in case a gas refill has been noted down the process is either stopped or a second review step takes place to evaluate the deviation and whether it possibly results from this interaction. For example, this can be partially manually by automatically triggering a corresponding request for the operator or fully automatic by performing a logic check like whether the change is within the required and expected boundaries. In case no such interaction is noted down step 5' includes triggering a first action. The first action includes a notification to the operator informing him/her about this deviation and sending a first action dataset to a database. Herein, the first action dataset is either stored as it is or according to the first action dataset a corresponding database dataset is changed. For example, the number of days providing a specified gas loss is increased by 1. Furthermore, the first action includes a determination step, wherein the dataset is evaluated with regard to the overall security taking into account the determined gas loss. In case certain limits specified by the operator are exceeded a replacement circuit breaker takes over and the monitored circuit breaker is taken off the grid. Simultaneously, a corresponding notification is sent to the operator and a maintenance or replacement is scheduled. Before, during or after the first action the dataset is stored in the dataset collection 1'.

In case the standard deviation does not exceed the predefined threshold the linear fitting line for the predefined prior time period being the last 90 days is calculated in step 6'. Herein, the datasets available for the last 90 days, wherein the present day is deemed to be one of these days, are retrieved from the dataset collection 1' and including the dataset collected in step 2' are utilized to provide the linear fitting line and its upper limit. The upper limit specifies the highest value of the linear fitting line within the predefined prior time period. As it is a linear line the upper limit can be either located at the first or last day of the linear fitting line so that it represents the value for either day 1 or day 90. This also applies in case day 90 is the present day and day 1 has not been measured. In this case, the theoretical value resulting from the linear fitting line is providing the upper limit. The numerical value of the gas pressure collected in step 2' is compared to the upper limit in step 7' and in case it is lower than 99% of the upper limit step 8' is performed including triggering a second action. The second action includes a notification to the operator to inform him/her about the deviation and draw his/her attention to this observation. Furthermore, a second dataset is sent to a database to update a gas loss protocol to eventually adapt the prediction of the future gas loss and required new $SF_6$ gas for refill actions.

Furthermore, the gradient of the linear fitting line is compared to a gradient limit in step 9'. It is determined whether the gradient is lower than the gradient limit being selected from the range from −0.01 to −0.0005 like −0.001. In case the gradient is lower step 10' takes place including triggering a third action. The third action includes notifying the operator. Furthermore, it includes sending a third action dataset to a database. Herein, the corresponding data is collected for the complete fleet of circuit breakers available at the site. Based on the data obtained maintenance and replacement plans are scheduled, wherein batches of circuit breakers are addressed. Herein, it is possible to determine the health and near future development of the circuit breakers with surprisingly high accuracy.

Figure 3:
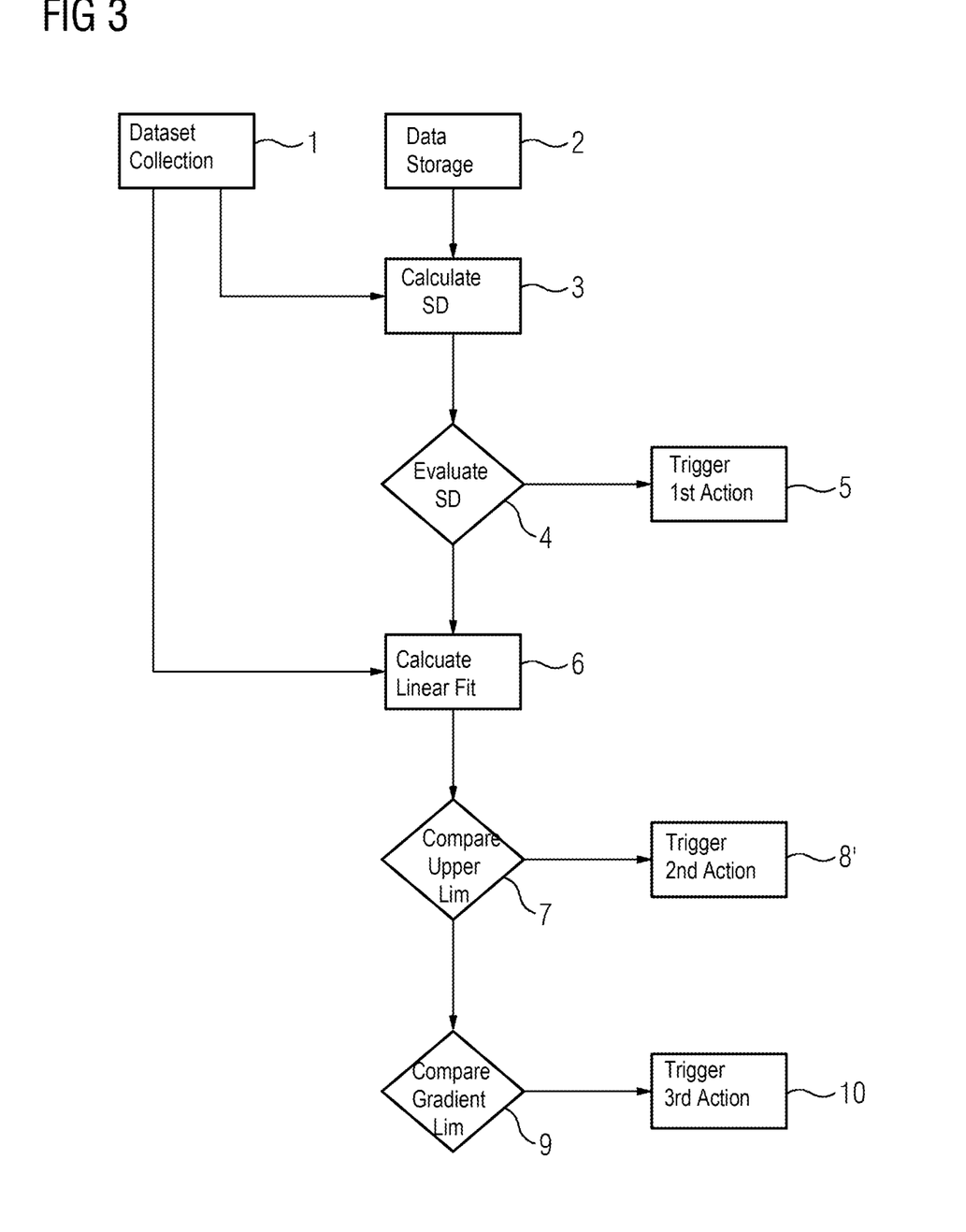
FIG. 3 shows a scheme of a further different embodiment of an inventive method.

FIG. 3 shows a scheme of another embodiment of the inventive method. In the following the features of an embodiment utilizing such scheme are included for illustrative purposes. However, other embodiments as specified in the description may be utilized for such scheme. The method is performed utilizing an inventive circuit breaker being part of an inventive monitoring system. The calculations are performed using a device providing a processor and a data storage executing a computer program product to trigger or execute the specified action.

Herein, the dataset containing the numerical values of the gas pressure and gas density of $SF_6$ in a circuit breaker is determined and stored on a data storage during step 2". The determination is performed each day during a specific condition like a predefined room temperature of the room containing the circuit breaker. Utilizing the collected dataset and datasets stored in the dataset collection 1" a standard deviation is calculated in step 3". Herein, the standard deviation is calculated based on at least four datasets collected during the period of the last five days, wherein the present days is deemed to be one of these five days. All datasets collected during this time period are utilized to calculate the standard deviation.

The standard deviations of the numerical value of the gas pressure and gas density are evaluated in step 4" whether they fulfill the requirements of the predefined thresholds being 1%. In case both exceed the threshold a first action is triggered in step 5". The first action includes a notification to the operator informing him/her about this deviation and sending a first action dataset to a database. Before, during or after the first action the dataset is stored in the dataset collection 1".

In case the standard deviation does not exceed the predefined threshold the linear fitting lines for the predefined prior time period being the last 30 days are calculated in step 6'. Herein, the datasets available for the last 30 days, wherein the present day is deemed to be one of these days, are retrieved from the dataset collection 1' and including the dataset collected in step 2' are utilized to provide the linear fitting line and its upper limit. The upper limit specifies the highest value of the linear fitting line within the predefined prior time period. As it is a linear line the upper limit can be either located at the first or last day of the linear fitting line so that it represents the value for either day 1 or day 30. This also applies in case day 30 is the present day and day 1 has not been measured. In this case, the theoretical value resulting from the linear fitting line is providing the upper limit. The numerical values of the gas density and gas pressure collected in step 2" are compared to the upper limit in step 7" and in case at least one is lower than 98.2% of the upper limit step 8" is performed including triggering a second action. The second action includes a notification to the operator to inform him/her about the deviation and draw his attention to this observation. Furthermore, a second dataset is sent to a database to update a gas loss protocol to eventually adapt the prediction of the future gas loss and required new $SF_6$ gas for refill actions.

In case the requirement with regard to the upper limit is fulfilled the linear fitting lines are further utilized in step 9" for a further evaluation. Herein, the gradients of the linear fitting lines are compared to a corresponding gradient limit. It is determined whether the gradients are lower than the gradient limit being selected from the range from −0.02 to −0.001 like −0.01. In case both gradients are lower step 10" takes place including triggering a third action. The third action includes notifying the operator and sending a third action dataset to a database.

The invention claimed is:

1. A method of monitoring a circuit breaker containing a gas with at least one gas characteristic providing a numerical value, comprising:
   a) collecting a dataset referring to the at least one gas characteristic inside the circuit breaker, wherein the dataset contains the numerical value of the at least one gas characteristic during a specific condition or specific time of the day, with the at least one gas characteristic corresponding to an amount of gas contained within the circuit breaker,
   b) calculating a standard deviation of the at least one gas characteristic of the datasets of at least 3 days of the last 10 days,
   c) comparing the standard deviation of the at least one gas characteristic with a predefined threshold value to detect a loss of gas within the circuit breaker, with the standard deviation and the predefined threshold being used to prevent false positives on the loss of gas within the circuit breaker, and
   d) triggering a first action in case the standard deviation exceeds the threshold value indicating a loss of gas within the circuit breaker.

2. The method according to claim 1,
   wherein the first action includes at least one action selected from the group consisting of a notification of an operator, sending a first action dataset to a database, triggering a security mechanism and triggering a further measurement of the at least one characteristic.

3. The method according to claim 1,
wherein the first action is stopped in case an interaction with the gas has taken place within the period of collecting the datasets.

4. The method according to claim 1,
wherein the collected dataset is stored in a database.

5. The method according to claim 1,
wherein the datasets refer to the at least one gas characteristic inside the circuit breaker during a specific time or interval of the day and/or wherein the at least one gas characteristic contains the gas density and/or the gas pressure.

6. The method according to claim 1,
wherein the gas is $SF_6$.

7. The method according to claim 1,
wherein the predefined threshold value is at most 1%.

8. The method according to claim 1,
wherein the standard deviation of the at least one gas characteristic of the datasets of at least 4 days of the last 8 days.

9. The method according to claim 1, further comprising:
e) in case the standard deviation is lower than the threshold value the datasets collected during a predefined prior time period are utilized to calculate a linear fitting line,
f) Wherein the dataset collected in step a) is compared to an upper limit of the linear fitting line, wherein the upper limit of the linear fitting line is the highest value of the linear fitting line within the predefined prior time period,
wherein a second action is triggered in case the dataset collected in step a) is less than 100% of the upper limit of the linear fitting line.

10. The method according to claim 9, further comprising:
g) in case the standard deviation is lower than the threshold value the datasets collected during a predefined prior time period are utilized to calculate a linear fitting line providing a gradient,
h) wherein the gradient is compared to a predefined gradient limit and/or adaptive gradient limit, and wherein in case the gradient is lower than the gradient limit a third action is triggered.

11. A circuit breaker comprising:
a monitoring device adapted to perform the method according to claim 1.

12. A monitoring system for a circuit breaker,
wherein the monitoring system is adapted to perform the method according to claim 1.

13. A method of monitoring the gas content of a circuit breaker, comprising:
using a circuit breaker according to claim 11 to monitor the gas content.

14. A non-transitory computer readable medium comprising:
program commands stored thereon and adapted to perform the method according to claim 1.

15. A device, comprising:
the non-transitory computer readable medium according to claim 14,
wherein the device provides the non-transitory computer readable medium for further use.

* * * * *